United States Patent [19]
Corman et al.

[11] Patent Number: 5,784,028
[45] Date of Patent: Jul. 21, 1998

[54] METHOD AND APPARATUS FOR SIMPLEX DELIVERY OF SIGNALS TO OBSTRUCTED GEOGRAPHICAL AREAS

[75] Inventors: David Warren Corman, Gilbert; Bary Robert Bertiger, Scottsdale; Dean Lawrence Cook, Mesa; Norbert Kleiner, Scottsdale; Kristine Patricia Maine, Phoenix, all of Ariz.

[73] Assignee: Motorola, Inc., Schaumburg, Ill.

[21] Appl. No.: 670,309

[22] Filed: Jun. 27, 1996

[51] Int. Cl.⁶ .................................................. G01S 5/02
[52] U.S. Cl. ........................ 342/357; 342/419; 340/573
[58] Field of Search ..................... 342/357, 419, 342/457, 463; 340/573

[56] References Cited

U.S. PATENT DOCUMENTS

| | | | |
|---|---|---|---|
| 5,117,490 | 5/1992 | Duxbury et al. | 395/375 |
| 5,223,844 | 6/1993 | Mansell et al. | 342/257 |
| 5,235,633 | 8/1993 | Dennison | 379/60 |
| 5,334,974 | 8/1994 | Simms et al. | 340/990 |
| 5,363,425 | 11/1994 | Mufti et al. | 379/38 |
| 5,379,045 | 1/1995 | Gilbert et al. | 342/357 |
| 5,382,958 | 1/1995 | FitzGerld | 342/386 |
| 5,418,537 | 5/1995 | Bird | 342/357 |
| 5,438,337 | 8/1995 | Aguado | 342/357 |
| 5,497,149 | 3/1996 | Fast | 340/988 |
| 5,552,772 | 9/1996 | Janky et al. | 340/573 |

*Primary Examiner*—Thomas H. Tarcza
*Assistant Examiner*—Dao L. Phan
*Attorney, Agent, or Firm*—Sherry J. Whitney

[57] ABSTRACT

A system (10) and method delivers simplex signals (26, 28) to a communication unit (24) located within an area (20) (e.g., a building) where an obstruction exists between the signal transmitter (12, 18) and the communication unit (24). The system (10) uses an infrastructure retransmission apparatus (14, 16, 22) to receive (204, 304, 402, 404) the signals (26, 28) and retransmit (208, 310, 410) them within the area (20). Geolocation signals (26) from navigation satellites (12) can be retransmitted (208, 310) using the infrastructure retransmission apparatus (14, 16, 22), thus enabling a communication unit (24) located within an obstructed area (20) to calculate its position.

26 Claims, 5 Drawing Sheets

METHOD AND APPARATUS FOR SIMPLEX DELIVERY OF SIGNALS TO OBSTRUCTED GEOGRAPHICAL AREAS

CROSS-REFERENCE TO RELATED APPLICATION

This application is related to co-pending U.S. patent application Ser. No. 08/672,171 entitled "Method and Apparatus for Providing Duplex Communication Service in Geographical Areas Where Conventional Services Are Obstructed", filed concurrently herewith and assigned to the same assignee as the present invention.

FIELD OF THE INVENTION

The present invention relates generally to simplex communications and, more particularly, to simplex communications using signal retransmitters.

BACKGROUND OF THE INVENTION

The quality of a radio frequency (RF) signal can be severely degraded when obstacles exist between the signal transmitter (e.g., a cellular base station or a satellite) and a receiver (e.g., a pager or cellular telephone). Where an obstacle is substantial enough, a signal can be completely blocked. Significant signal degradation occurs within obstructed areas such as, for example, dense urban areas, tunnels, and in heavily forested or mountainous regions.

Often times, a user of a cellular telephone or pager must change his or her location in order to obtain acceptable communication quality. Users located within buildings, for example, might need to move outside the building in order to receive signals from a particular communication system.

The necessity to reorient oneself depends on the ability of a communication system signal to penetrate the obstacles which exist between a system transmitter and a receiver. This ability depends, in part, on the transmission strength of the signal and the distance between the system transmitter and the receiver.

Signals from navigation (i.e., geolocation) satellites suffer substantially from obstacles along the transmission path because such satellites are located at great distances (i.e., approximately 11,000 miles) from the surface of the earth. Receivers which are located within buildings or other obstructed areas are often incapable of receiving navigation satellite signals. This precludes the users of such receivers from receiving services, such as geolocation services, provided by those satellites.

Similar communication limitations can exist for services provided from either Low Earth Orbiting (LEO) satellites or Medium Earth Orbiting (MEO) satellites in that they are also located at large distances from the surface of the earth and can suffer from unfavorable angles of signal arrival. Receivers located within obstructed areas could also be precluded from receiving service provided by the LEO or MEO satellites.

Geolocation services are particularly important for cellular telephone and pager use. A worldwide communication system (e.g., a worldwide satellite communication system), for example, must have knowledge of the location of a mobile telephone or pager in order to contact the device. In addition, a device's location is often used for billing purposes. Prior art systems use an identification number of a cell within which the device is communicating to make a rough approximation of the device's location. However, the granularity of the approximation is governed by the size of the cell which can be as large as 500 kilometers in diameter. A more accurate determination of location is often necessary, especially near international borders where billing differences are important. This makes the ability of the device to use geolocation desirable.

Prior art solutions to the blocked signal problem involve positioning an antenna in a location (e.g., on a rooftop) where the antenna is capable of receiving the otherwise degraded signals. The antenna is then hardwired to the receiver. Although this approach works well for stationary equipment such as a stationary television, for example, a hardwired connection is impractical between a stationary antenna and a portable communication device such as a pager, mobile telephone, portable facsimile, data, or television equipment.

What is needed is a method and apparatus which enables portable communication devices to receive high-quality signals while such devices are located within obstructed areas. Further needed is a method and apparatus which enables such devices to receive geolocation signals so that accurate position determination can be achieved.

DETAILED DESCRIPTION OF THE DRAWINGS

The method and apparatus of the present invention enables portable communication devices to receive high-quality signals while such devices are located within obstructed areas. The method and apparatus of the present invention also enables such devices to receive geolocation signals so that accurate position determination can be achieved.

The method and apparatus of the present invention achieves these advantages, and more, by providing a signal retransmission means which captures signals and retransmits them within an obstructed area to portable devices within that area. The captured signals can be, for example, geolocation signals which enable accurate device position determination.

The method and apparatus of the present invention can be used in any area within which signals are obstructed. Portions of the description describe the apparatus of the present invention being deployed within a building, but this is for exemplary purposes only. The apparatus and method of the present invention are equally applicable to other obstructed areas (e.g., tunnels, mines, ships). In addition, the description describes retransmission of geolocation signals in particular. This also is for exemplary purposes only, and the method and apparatus of the present invention can be used to retransmit any type of signal.

Figure 1:
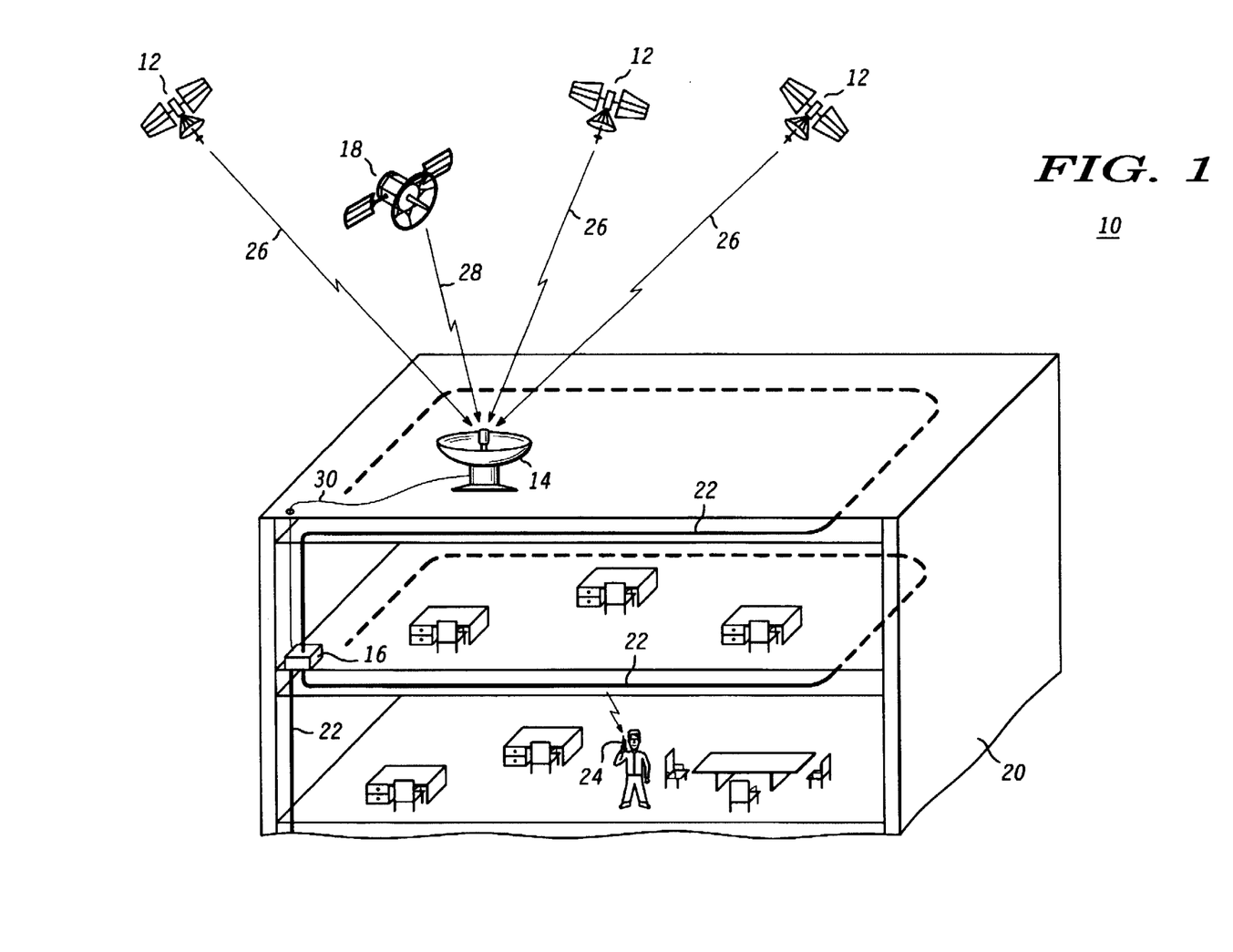
FIG. 1 illustrates a communication system in accordance with a preferred embodiment of the present invention.

FIG. 1 illustrates communication system 10 in accordance with a preferred embodiment of the present invention. Communication system 10 comprises multiple navigation satellites 12, antenna 14, at least one repeater base station 16, and at least one communication unit 24. Communication unit 24 could be, for example, a portable or stationary telephone, radio, pager, facsimile, data device, television, or other communication device. In a preferred embodiment, communication system 10 also comprises at least one communication satellite 18, although, in alternate embodiments, communication satellite 18 can be omitted.

Antenna 14 and repeater base station 16 are deployed in proximity to an area in which geolocation signals from navigation satellites 12 are attenuated due to obstructions. As shown in FIG. 1 for exemplary purposes, antenna 14 is located outside of and repeater base station 16 is located within building 20. Antenna 14 and repeater base station 16 could also be used to provide improved signal quality within any other man-made or natural obstructed area.

Navigation satellites 12 could be, for example, satellites used for geolocation such as Global Positioning System (GPS) satellites. Navigation satellites 12 communicate with antenna 14 over links 26 which can be, for example, radio frequency (RF) or laser links. In a preferred embodiment, links 26 carry almanac data (i.e., data which describes a position of the satellite) from navigation satellites 12 which can be used to calculate a position of antenna 14.

Communication satellite 18 could be, for example, a LEO, MEO, or geosynchronous satellite which can link with other nodes of a communication system in order to provide voice, data messages, and/or direct broadcast television to communication units 24. Communication satellite 18 communicates with antenna 14 over link 28 which can be, for example, radio frequency (RF), or laser links. Link 28 desirably carries data signals such as, for example, voice, pager, facsimile, and/or direct broadcast television data. In an alternate embodiment, earth-based transmission devices, such as a cellular base station or radio, could be used to provide voice and data messages rather than communication satellite 18.

Repeater base station 16 is coupled to antenna 14 via link 30 which can be, for example, a cable or an RF, fiber-optic, or laser link. Repeater base station 16 can be co-located with or remote from antenna 14. Repeater base station is also coupled to signal distribution means 22. Signal distribution means 22 can be, for example, a leaky coaxial cable, conventional coaxial cable, fiber-optic cable, or broadcast antenna. Signal distribution means 22 is desirably positioned so that signal distribution means 22 can retransmit signals within obstructed areas (e.g., buildings, tunnels, urban canyons) in which navigation satellite signals and/or communication satellite signals cannot adequately penetrate. For example, signal distribution means 22 could be located within a dropped ceiling or raised floor on each floor of building 20.

As will be described in detail in conjunction with FIGS. 2-9, when signals are received by antenna 14 from either or both navigation satellites 12 and communication satellites 18, these signals, in their original or a modified form, are sent through repeater base station 16 to signal distribution means 22. Signal distribution means 22 enables one or more communication units 24 to receive the signals which would, otherwise, have been partially or completely blocked. A combination of antenna 14, repeater base station 16, and signal distribution means 22 is referred to herein as an "infrastructure retransmitted".

Figure 2:
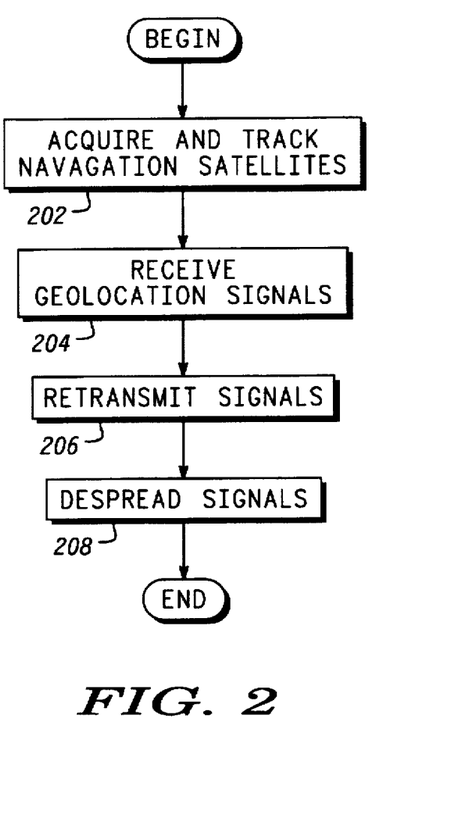
FIG. 2 illustrates a method for an infrastructure retransmitter to retransmit geolocation signals within an obstructed area in accordance with a preferred embodiment of the present invention.

FIG. 2 illustrates a method for an infrastructure retransmitter to retransmit geolocation signals within an obstructed area (e.g., building 20, FIG. 1) in accordance with a preferred embodiment of the present invention. In this embodiment, geolocation signals are directly retransmitted without modification. Therefore, the method of this embodiment could be considered a "bent-pipe" system.

The method begins by an antenna (e.g., antenna 14, FIG. 1) acquiring and tracking navigation satellites (e.g., navigation satellites 12, FIG. 1) in step 202. In a preferred embodiment, at least four navigation satellites are acquired and tracked in order to provide adequate data for location determination in three dimensions. In alternate embodiments, more or fewer navigation satellites can be acquired and tracked.

In step 204, the antenna receiver receives geolocation signals from multiple navigation satellites, typically in the form of spread-spectrum data In step 206, the spread spectrum geolocation signals are retransmitted within the obstructed area via a repeater base station (e.g., repeater base station 16, FIG. 1) and a signal distribution means (e.g., signal distribution means 22, FIG. 1). Although the term "retransmission" is used herein, it is intended to encompass signal regeneration and repeating also. Retransmission of the signals is described in more detail in conjunction with FIGS. 5-9.

The communication device (e.g., communication unit 24, FIG. 1) then despreads the signals in step 208. The despread signals enable a distance to each respective satellite to be calculated by the receiver or another device. Knowing the distance to each satellite as well as the optimal satellite geometry allows the receiver's unique position in space to be calculated. This function is typically performed by a geolocation (e.g., GPS) receiver. The procedure then ends.

In alternate embodiments, messages other than geolocation signals could be retransmitted using the method described in conjunction with FIG. 2. For example, the method could be used to retransmit paging or ring alerts destined for a particular communication unit. The other types of signals could originate from devices other than navigation satellites. For example, the signals could originate from LEO, MEO, or other geosynchronous satellites, or from ground based equipment. Acquisition and tracking of the other devices would be performed in accordance with the device type. In addition, the processing performed on the signal prior to retransmission would depend on the type of signal.

Figure 3:
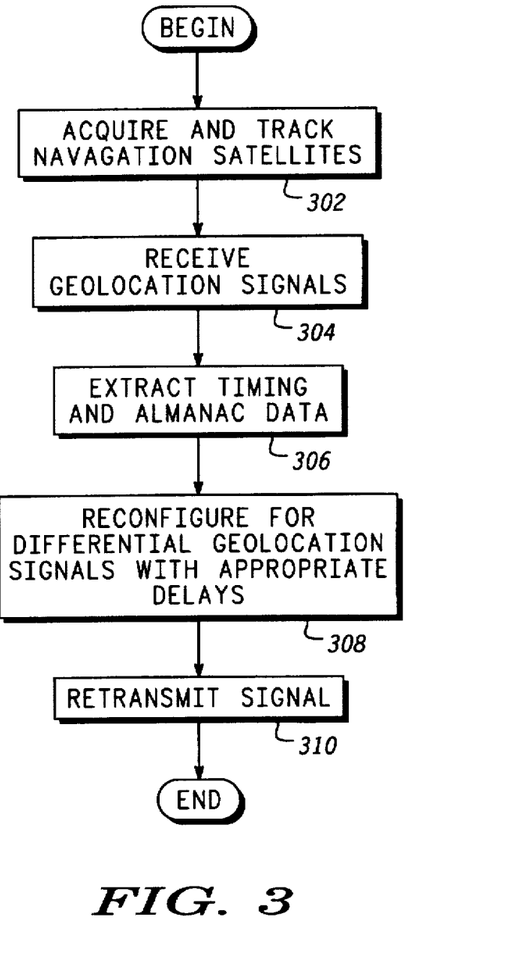
FIG. 3 illustrates a method for an infrastructure retransmitter to retransmit differential geolocation signals within an obstructed area in accordance with a preferred embodiment of the present invention.

FIG. 3 illustrates a method for an infrastructure retransmitter to retransmit differential geolocation signals within an obstructed area in accordance with a preferred embodiment of the present invention. In this embodiment, geolocation signals are modified prior to retransmission. The method shown in FIG. 3 is particularly useful for position determination by communication units located within large obstructed areas (e.g., tunnels or urban canyons) rather than smaller areas (e.g., buildings).

The method begins, in step 302, by an antenna (e.g., antenna 14, FIG. 1) acquiring and tracking navigation satellites (e.g., navigation satellites 12 FIG. 1). Optimally, a geolocation receiver (e.g., a GPS receiver) associated with the antenna tracks at least four navigation satellite signals. In step 304, the antenna receives geolocation signals from the navigation satellites. These signals typically are in the form of spread-spectrum data.

Timing and satellite almanac data are calculated from the geolocation signals in step 306. From the signals, the receiver calculates a range to each navigation satellite and solves for position and timing.

The geolocation signals are reconfigured, in step 308, for differential geolocation signals with appropriate delays using the extracted timing and almanac data. Differential geolocation processing requires spatially separated antenna units, dispersed at different locations around the obstructed area. These separated units are calibrated and placed in order to simulate the original navigation signal, thus allowing the receiver to calculate its position. The receiver calculates its position based on the distances between the dispersed antenna units which directly received the navigation satellite signal or a rebroadcast of the original navigation satellite signal.

The calibrated antenna units are placed so that a more precise location can be calculated by the receiver. Similar methods have been used for aircraft instrument approaches using GPS navigation and precise geodetic measurements. However, the method of the present invention enables a much larger obstructed area to be covered than is possible with prior art methods.

In step 310, the differential geolocation signals are retransmitted, with the appropriate delays, within the obstructed area via a repeater base station (e.g., repeater base station 16, FIG. 1) and a signal distribution means (e.g., signal distribution means 22, FIG. 1). Retransmission of the signals is described in more detail in conjunction with FIGS. 5-9. The procedure then ends.

Figure 4:
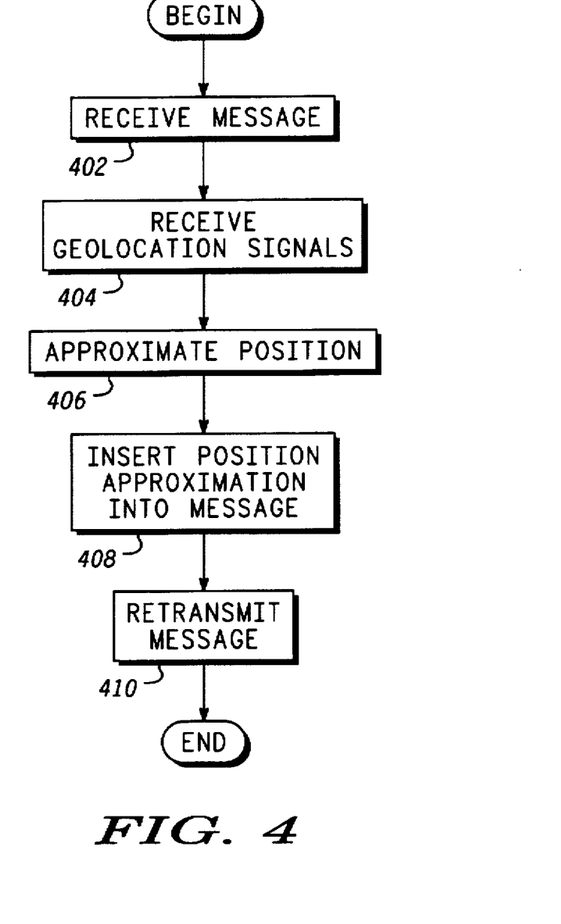
FIG. 4 illustrates a method for an infrastructure retransmitter to combine and retransmit messages with geolocation signals in accordance with a preferred embodiment of the present invention.

FIGS. 2-3 illustrated embodiments where a communication unit receives unmodified or modified geolocation signals from which the communication unit can calculate its approximate position. These embodiments assume that the communication unit is capable of position calculations (i.e., that the communication unit includes a geolocation receiver). The method and apparatus of the present invention can also be used in systems where a communication unit is not capable of calculating its position. FIG. 4 illustrates an embodiment where a communication unit can receive geolocation information without position calculation capabilities.

FIG. 4 illustrates a method for an infrastructure retransmitter to combine and retransmit messages with geolocation signals in accordance with a preferred embodiment of the present invention. Although FIG. 4 illustrates that a message is combined with the geolocation signals, the message could be retransmitted without the geolocation signals in an alternate embodiment The method begins, in step 402, when an antenna (e.g., antenna 14, FIG. 1) receives a message from a communication satellite (e.g., communication satellite 18, FIG. 1) or some other message source (e.g., a ground-based cellular base station). In step 404, the antenna can also receive geolocation signals such as those which have been described previously or can be programmed with its known, fixed x, y, z location in space.

From the geolocation signals, the infrastructure retransmitter approximates a position of the antenna in step 406. Position estimation can be performed, for example, using triangularization or any other position-estimation technique. For the case of a fixed location infrastructure, the programmed x, y, z location in space could be used.

In step 408, the approximated position is inserted into the received message. The message is then retransmitted, in step 410, to communication units within the obstructed area via a repeater base station (e.g., repeater base station 16, FIG. 1) and a signal distribution means (e.g., signal distribution means 22, FIG. 1). Retransmission of the signals is described in more detail in conjunction with FIGS. 5-9. The procedure then ends.

In an alternate embodiment, retransmitting an approximated position can occur without combining the approximated position with another message. In such an alternate embodiment, steps 402 and 408 would be unnecessary and step 410 would transmit the approximated position only.

The method of retransmission depends on the type of signal distribution means deployed within the obstructed area For example, the signal distribution means can be fiber-optic cable, leaky or conventional coaxial cable, or one or more broadcast antennas. FIGS. 5-9 describe methods for retransmission using various types of signal distribution means. Each of the methods of FIGS. 5-9 could be used, for example, in retransmit steps 208 (FIG. 2), 310 (FIG. 3), and 410 (FIG. 4).

Figure 5:
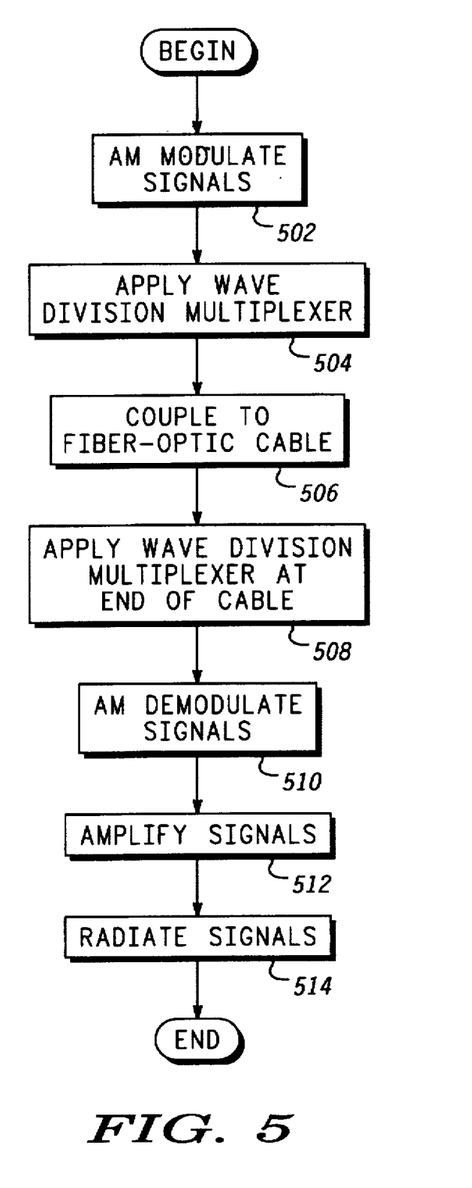
FIG. 5 illustrates a method for a repeater base station to retransmit signals using a fiber-optic distribution means in accordance with a preferred embodiment of the present invention.

FIGS. 5-9 describe methods of retransmitting signals to communication units using different types of signal distribution means. FIG. 5 illustrates a method for a repeater base station to retransmit signals using a fiber-optic distribution means in accordance with a preferred embodiment of the present invention. The method begins after geolocation signals have been received, for example, in steps 204 (FIG. 2), 304 (FIG. 3) or 404 (FIG. 4). In step 502, the geolocation and messaging RF signals are Amplitude Modulated (AM) onto two separate optical carriers, each with a unique wavelength. The optical modulation is typically in the form of direct AM modulation of a laser diode whose output amplitude is controlled by the amplitude of the input RF signal.

A wave division multiplexer (WDM) is then applied, in step 504, to combine the optical carriers into a single composite optical signal. Because the input optical carriers have different wavelengths, isolation between the optical carriers (and hence RF carriers) is provided by the WDM.

In step 506, the composite optical signal is coupled to a fiber-optic cable signal distribution network. Fiber-optic cabling is desirable because it provides very low loss transmission to the remote location.

Once the composite optical signal reaches the end of the fiber-optic cable, it is wave division multiplexed back into two separate optical carriers in step 508. Isolation between the two optical carriers is provided by this second WDM.

The two optical carriers are then AM demodulated in step 510, resulting in the two separate geolocation and messaging signals. The optical demodulation is typically in the form of direct AM demodulation by a photo detector diode whose output amplitude is controlled by the amplitude of the input optical signal.

In step 512, the geolocation and messaging RF signals are then amplified and, in step 514, retransmitted within the obstructed area by radiating the signal via a wide field of view RF antenna. The procedure then ends. The WDM is only used for exemplary purposes as a method to send multiple signals along a single fiber-optic cable. Clearly separate fiber cables could be used for each optical carrier in which case steps 504 and 508 would not be required.

Figure 6:
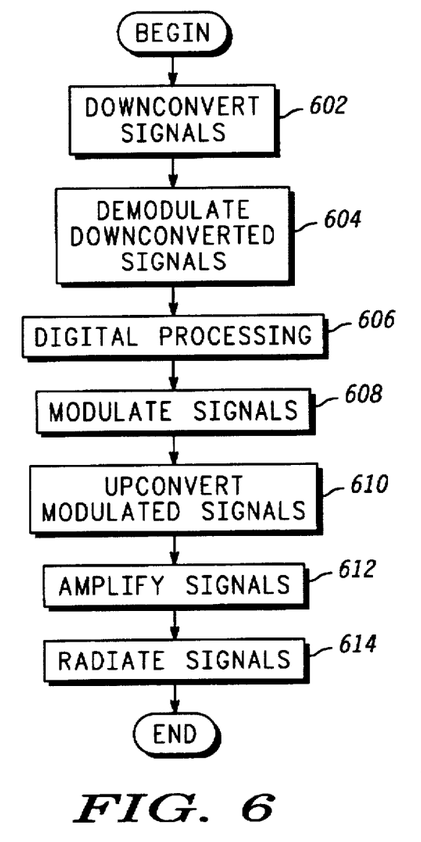
FIG. 6 illustrates a method for a repeater base station to retransmit signals using a fiber-optic distribution means in accordance with an alternate embodiment of the present invention.

FIG. 6 illustrates a method for a repeater base station to retransmit signals using a fiber-optic distribution means in accordance with an alternate embodiment of the present invention. The method begins, in step 602, when received geolocation and messaging signals are downconverted to IF frequencies which are low enough for RF demodulation to be performed. The IF signals are then demodulated, in step 604, to translate the signals to baseband. The baseband signals are typically in digital format. Digital processing is then performed, in step 606, providing any necessary system functions such as data storage, time delay, header reformatting, and control signal insertion, for example.

The baseband signals are then modulated, in step 608, onto suitable IF frequencies. In step 610, the modulated IF signals are upconverted to suitable RF frequencies. The geolocation and messaging RF signals are then amplified, in step 612, and retransmitted, in step 614, within the obstructed area by radiating via a wide field of view antenna. The procedure then ends.

Figure 7:
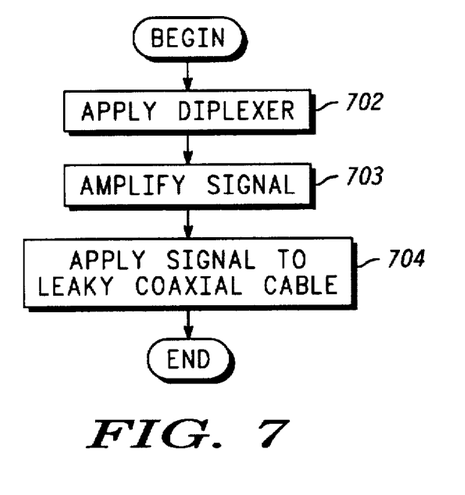
FIG. 7 illustrates a method for a repeater base station to retransmit signals using a leaky coaxial cable distribution means in accordance with a preferred embodiment of the present invention.

FIG. 7 illustrates a method for a repeater base station to retransmit signals using a leaky coaxial cable distribution means in accordance with a preferred embodiment of the present invention. The method begins after geolocation signals have been received, for example, in steps 204 (FIG. 2), 304 (FIG. 3) or 404 (FIG. 4). In step 702, the geolocation and messaging signals, when both are received, are combined, using a diplexer into a single composite signal. The signals will typically be at diverse frequencies. The frequency diversity between the two signals allows proper diplexing action to be accomplished and isolation between the signals to be maintained The composite signal is then amplified in step 703 and applied, in step 704, to a leaky coaxial cable distribution system. Because a leaky coaxial cable radiates controlled low levels of RF energy over its entire length, uniform coverage within the obstructed area can be achieved. If necessary, a diplexer/amplifier/diplexer combination can be employed at appropriate points along the distribution system to provide further signal boost. In addition, the amplification step 703 could be applied prior to the diplexing step 702. The procedure then ends.

Figure 8:
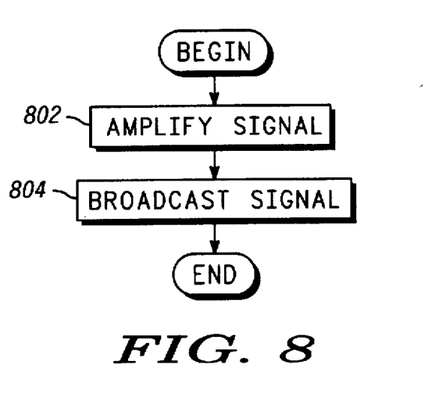
FIG. 8 illustrates a method for a repeater base station to retransmit signals by rebroadcasting in accordance with a preferred embodiment of the present invention.

FIG. 8 illustrates a method for a repeater base station to retransmit signals by rebroadcasting in accordance with a preferred embodiment of the present invention. The method begins after geolocation signals have been received, for example, in steps 204 (FIG. 2), 304 (FIG. 3) or 404 (FIG. 4). In step 802, the received geolocation signal (or combined message and geolocation signal) is amplified. The amplified signal is then broadcast, in step 804, using one or more broadcast antennas dispersed throughout the obstructed area.

Isolation between the receiver and transmitter signals can be provided by physical separation between receive and transmit antennas or by time and/or frequency translation within the repeater. The procedure then ends.

Figure 9:
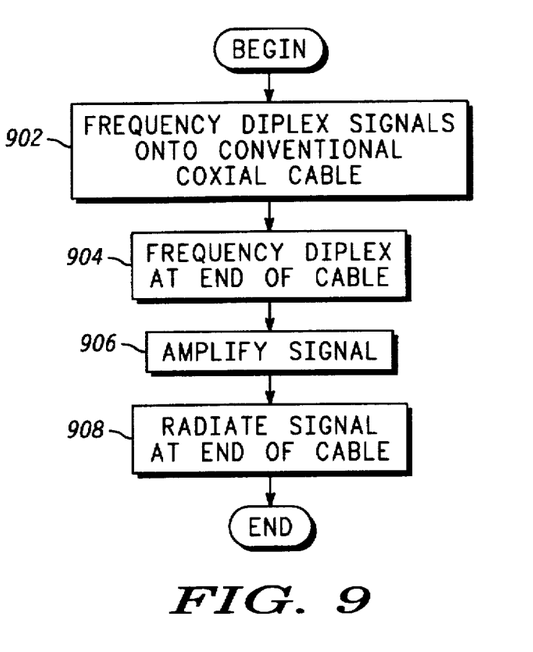
FIG. 9 illustrates a method for a repeater base station to retransmit signals using a conventional coaxial cable distribution means in accordance with a preferred embodiment of the present invention.

FIG. 9 illustrates a method for a repeater base station to retransmit signals using a conventional coaxial cable distribution means in accordance with a preferred embodiment of the present invention. The method begins after geolocation signals have been received, for example, in steps 204 (FIG. 2), 304 (FIG. 3) or 404 (FIG. 4). In step 902, the received geolocation signal (or combined message and geolocation signal) is frequency diplexed onto a single conventional coaxial cable distribution system. At the end of the cable, the composite signal is diplexed, if necessary, back into separate geolocation and messaging RF signals using a suitable frequency diplexer, in step 904.

The signals are amplified in step 906 and radiated in step 908 using suitable RF antennas. The procedure then ends.

Figure 10:
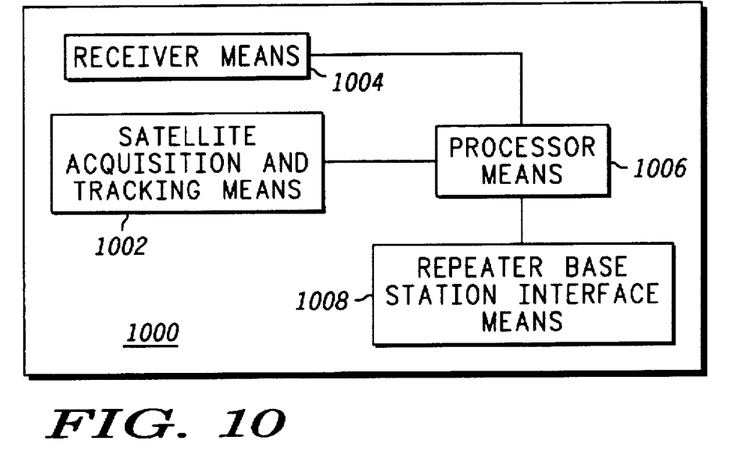
FIG. 10 illustrates a block diagram of an antenna in accordance with a preferred embodiment of the present invention.
Figure 11:
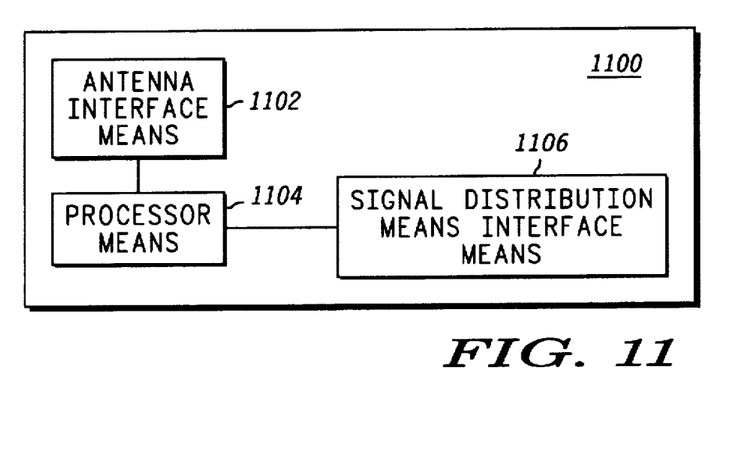
FIG. 11 illustrates a block diagram of a repeater base station in accordance with a preferred embodiment of the present invention.
Figure 12:
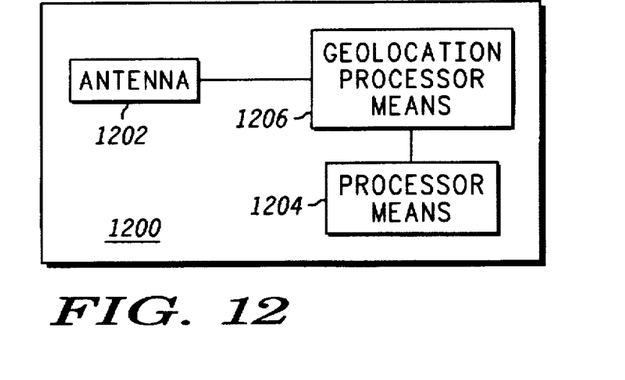
FIG. 12 illustrates a block diagram of a communication unit in accordance with a preferred embodiment of the present invention.

FIGS. 10–12 illustrate preferred embodiments of apparatuses used to carry out the method of the present invention. FIG. 10 illustrates a block diagram of antenna 1000 in accordance with a preferred embodiment of the present invention. Antenna 1000 comprises satellite acquisition and tracking means 1002, receiver means 1004, processor means 1006, and repeater base station interface means 1008.

In a preferred embodiment, satellite acquisition and tracking means 1002 acquires and tracks at least one satellite such as, for example, navigation satellites (e.g., GPS satellites). In order to calculate a position in three dimensions, at least four satellites must be acquired although more or fewer satellites can be acquired. In alternate embodiments, satellite acquisition and tracking means 1002 can acquire and track other types of satellites (e.g., communication satellite 18, FIG. 1). Distinct physical equipment could be necessary to acquire and track each satellite. All such equipment is interpreted to be part of satellite acquisition and tracking means 1002, even though such equipment could be physically separated.

In an alternate embodiment, where geolocation is performed using equipment other than navigation satellites (e.g., ground-based equipment, airborne equipment, or satellites which move with respect to the surface of the earth), a different and appropriate acquisition and tracking means could be used in place of or in addition to satellite acquisition and tracking means 1002.

Receiver means 1004 is used to receive signals from at least one satellite or other device. These signals could contain, for example, information necessary to perform geolocation, or they could contain voice, data, facsimile, or paging information.

Processor means 1006 is used, in a preferred embodiment, to control the functioning of the other components of antenna 1000. When signals to be retransmitted are not modified (e.g., FIG. 2), processor means 1006 does not need to, but may, alter such signals. Where signals to be retransmitted are modified (e.g., FIGS. 3–4), processor means 1006 can perform the modifications in a preferred embodiment. For example, when differential geolocation signals are retransmitted to communication units as described in conjunction with FIG. 3, processor means 1006 can perform some or all of steps 306–308. When geolocation signals are combined with a message from a communication satellite as described in conjunction with FIG. 4, processor means 1006 can perform some or all of steps 406–408. In alternate embodiments, some or all of such modifications can be performed by a repeater base station (e.g., repeater base station 1100, FIG. 11).

Signals received by receiver means 1004 (and possibly modified by processor means 1006) are then sent to repeater base station interface means 1008 so that such signals can be retransmitted by a repeater base station (e.g., repeater base station 1100, FIG. 11). Repeater base station interface means 1008 can link antenna 1000 with a repeater base station over a hard-wired, or laser link, for example.

FIG. 11 illustrates a block diagram of repeater base station 1100 in accordance with a preferred embodiment of the present invention. Repeater base station 1100 comprises antenna interface means 1102, processor means 1104, and signal distribution means interface means 1106. One or more repeater base stations 1100 can be deployed within an obstructed area in order to provide signals to communication units within that area.

Antenna interface means 1102 links repeater base station 1100 to an antenna (e.g., antenna 1000, FIG. 10) and receives signals from the antenna over the link.

Processor means 1104 controls the other components of repeater base station 1100 and also controls retransmission of the signals received by antenna interface means 1102. When signals to be retransmitted are not modified (e.g., FIG. 2), processor means 1104 does not need to, but may, alter such signals. Where signals to be retransmitted are modified (e.g., FIGS. 3–4), processor means 1104 can perform the modifications although, in a preferred embodiment, such modifications are performed by the antenna. For example, when differential geolocation signals are retransmitted to communication units as described in conjunction with FIG. 3, processor means 1104 can perform some or all of steps 306–308. When geolocation signals are combined with a message from a communication satellite as described in conjunction with FIG. 4, processor means 1104 can perform some or all of steps 406–408.

Signal distribution means interface means 1106 connects repeater base station 1100 with an infrastructure distribution system such as, for example, a fiber-optic cable, leaky or conventional coaxial cable, or broadcast antenna system which is dispersed throughout all or a part of an obstructed area. Signals to be retransmitted, whether modified or not, are retransmitted via such infrastructure distribution system.

FIG. 12 illustrates a block diagram of communication unit 1200 in accordance with a preferred embodiment of the present invention. In a preferred embodiment, communication unit 1200 comprises antenna means 1202, processor means 1204, and geolocation processor means 1206. In an alternate embodiment, communication unit 1200 need not include geolocation processor means 1206. Antenna means 1202 receives signals from infrastructure distribution system when communication unit 1200 is located within an obstructed area. Processor means 1204 controls the components of communication unit 1200, where necessary, and processes received messages. Processor means can also perform voice and/or data processing functions when received signals are of a type other than geolocation information.

Geolocation processor means 1206 receives geolocation data, via antenna means 1202, and uses the geolocation data to self-determine a location of communication unit 1200. As described previously, geolocation data could be bent-pipe data which was received from the navigation satellites, or the geolocation data could be differential geolocation data which was modified by either antenna 1000 (FIG. 10) or repeater base station 1100 (FIG. 11).

In an alternate embodiment, communication unit 1200 need not include geolocation processor means 1206 in order to determine an approximation of its location. When either antenna 1000 (FIG. 10) or repeater base station (FIG. 11) have approximated a position (e.g., step 506, FIG. 5) and inserted the position approximation into a message, communication unit 1200 need only extract the position approximation from the message in order to get an approximation of its position.

In summary, a method and apparatus has been described which enables signals, such as geolocation, voice, data, facsimile, direct television, paging, or other signals, to be retransmitted within an obstructed area.

The present invention has been described above with reference to preferred and alternate embodiments. However, those skilled in the art will recognize that changes and modifications may be made in these embodiments without departing from the scope of the present invention. For example, the processes and stages identified herein may be categorized and organized differently than described herein while achieving equivalent results. These and other changes and modifications which are obvious to those skilled in the art are intended to be included within the scope of the present invention.

What is claimed is:

1. A method for providing a signal to a communication unit located within an area where an obstruction exists between a transmitter of the signal and the communication unit, the method comprising the steps of:

a) deploying a signal distribution means within the area where the obstruction exists between the transmitter of the signal and the communication unit;

b) receiving the signal from the transmitter by an antenna located in a proximity to but outside the area where the obstruction exists, wherein the signal contains geolocation information; and c) retransmitting the signal within the area by applying the signal to a signal distribution means which is dispersed throughout the area, wherein the retransmitting step enables the obstruction to be bypassed so that the communication unit can receive the signal.

2. The method as claimed in claim 1, wherein step c) comprises the step of:

c1) retransmitting the signal by retransmitting the geolocation information.

3. The method as claimed in claim 1, wherein step c) comprises the steps of:

c1) extracting satellite almanac data from the signal;
   c2) extracting timing information from the signal;
   c3) reconfiguring the signal into a differential geolocation signal using delays derived from the timing information and the satellite almanac data, resulting in a reconfigured signal; and
   c4) retransmitting the reconfigured signal as the signal.

4. The method as claimed in claim 1, wherein step c) comprises the step of:

c1) extracting satellite almanac data from the signal;
   c2) extracting timing information from the signal;
   c3) calculating an approximate location from the satellite almanac data and the timing information; and
   c4) retransmitting the approximate location as the signal.

5. A method for providing a signal to a communication unit located within an area where an obstruction exists between a transmitter of the signal and the communication unit, the method comprising the steps of:

a) receiving the signal from the transmitter by a device located in a proximity to but outside the area where the obstruction exists; and b) retransmitting the signal within the area, by the device, by applying the signal to a signal distribution means which is dispersed throughout the area wherein the retransmitting step enables the obstruction to be bypassed so that the communication unit can receive the signal.

6. The method as claimed in claim 5, wherein the signal is a data packet destined for the communication unit.

7. The method as claimed in claim 5, wherein the area exists within a building, and step a) comprises the step of:
   a1) receiving the signal by the device, wherein the device is located in the proximity to the building, and step b) comprises the step of:
   b1) retransmitting the signal by applying the signal to the signal distribution means which is dispersed throughout the building.

8. The method as claimed in claim 5, wherein step a) comprises the step of:
   a1) receiving the signal from a satellite.

9. The method as claimed in claim 5, wherein step b) comprises the steps of:
   b1) amplifying the signal, resulting in an amplified signal; and
   b2) retransmitting the signal by applying the amplified signal to the signal distribution means, wherein the signal distribution means comprises a broadcast antenna.

10. The method as claimed in claim 5, wherein step b) comprises the step of:
    b1) retransmitting the signal by coupling a multiplexed signal derived from the signal to the signal distribution means, wherein the signal distribution means comprises a fiber-optic cable at whose end the multiplexed signal is de-multiplexed, demodulated, and radiated.

11. The method as claimed in claim 5, wherein step b) comprises the step of:
    b1) retransmitting the signal by coupling a multiplexed signal derived from the signal to the signal distribution means, wherein the signal distribution means comprises separate fiber cables which are used for each of multiple optical carriers.

12. The method as claimed in claim 5, wherein step b) comprises the steps of:
    b1) amplifying the signal, resulting in an amplified signal; and
    b2) retransmitting the signal by applying the amplified signal to the signal distribution means, wherein the signal distribution means comprises a leaky coaxial cable.

13. The method as claimed in claim 5, wherein step b) comprises the steps of:
    b1) amplifying the signal, resulting in an amplified signal; and
    b2) retransmitting the signal by applying the amplified signal to the signal distribution means, wherein the signal distribution means comprises a conventional coaxial cable.

14. A method for a communication unit to receive a signal when the communication unit is located within an area where an obstruction exists between a transmitter of the signal and the communication unit, the method comprising the step of:
    a) receiving a retransmitted signal from a signal distribution means which is dispersed throughout the area where the obstruction exists, wherein the signal distribution means retransmitted the signal after receiving the signal from a device located in a proximity to, but outside of the area, after the device received the signal from the transmitter.

15. The method as claimed in claim 14, wherein the retransmitted signal is a geolocation signal, the method further comprising the step of:
    b) determining a position of the communication unit from information contained within the geolocation signal, wherein the geolocation signal is substantially similar to the signal received by an antenna located in a proximity to the area and coupled to the signal distribution means.

16. The method as claimed in claim 14, further comprising the step of:
    b) determining an approximate position of the communication unit from information contained within the retransmitted signal, wherein the retransmitted signal comprises an approximate location of an antenna which is located in a proximity to the area and which is coupled to the signal distribution means, and the approximate location of the antenna was derived from the signal received by the antenna.

17. The method as claimed in claim 14, further comprising the step of:
    b) determining an approximate position of the communication unit from information contained within the retransmitted signal, wherein the retransmitted signal comprises a location of an antenna which is located in a proximity to the area and which is coupled to the signal distribution means, the antenna is fixed in space, and the location of the antenna is a programmed location.

18. The method as claimed in claim 14, wherein the retransmitted signal is a geolocation signal, the method further comprising the step of:
    b) determining a position of the communication unit from information contained within the retransmitted signal, wherein the retransmitted signal comprises differential geolocation information derived from the signal received by an antenna located in a proximity to the area and coupled to the signal distribution means.

19. A communication system comprising:
    multiple navigation satellites for sending geolocation signals;
    a repeater base station located in a proximity to an obstructed area within which the geolocation signals are significantly attenuated, wherein the repeater base station is coupled to an antenna which is located outside of the obstructed area and which receives the geolocation signals from the multiple navigation satellites, and the repeater base station is also coupled to a signal distribution means dispersed throughout the obstructed area, and the repeater base station retransmits the geolocation signals within the obstructed area using the signal distribution means which enables the obstruction to be bypassed so that a communication unit located within the obstructed area can receive the geolocation signal which have been retransmitted; and
    the communication unit located within the obstructed area, for receiving the geolocation signals which are retransmitted by the repeater base station via the signal distribution means.

20. The communication system as claimed in claim 19, wherein the communication unit is further for calculating a location of the communication unit using the geolocation signals which are retransmitted by the repeater base station.

21. The communication system as claimed in claim 19, wherein the repeater base station is further for calculating a location of the repeater base station using the geolocation signals, and for transmitting the location to the communication unit using the signal distribution means.

22. A repeater base station apparatus for receiving and retransmitting geolocation signals, the repeater base station apparatus comprising:

a receiver for receiving the geolocation signals from at least one navigation satellite via an antenna coupled to the repeater base station wherein the antenna is located outside of an obstructed area within which the geolocation signals from the at least one navigation satellite would be significantly attenuated;

a processor, coupled to the receiver, for processing the geolocation signals in order to prepare them for retransmission within the obstructed area; and an infrastructure distribution system interface, coupled to the processor and to an infrastructure distribution system which is dispersed throughout the obstructed area, the infrastructure distribution system interface for retransmitting the geolocation signals which have been processed by the processor to a communication unit located within the obstructed area using the infrastructure distribution system thereby enabling an obstruction to be bypassed so that a communication unit located within the obstructed area can receive the geolocation signal which have been retransmitted.

23. The repeater base station apparatus as claimed in claim 22, wherein the processor is further for calculating a location of the repeater base station apparatus using the geolocation signals and for sending data describing the location to the communication unit via the infrastructure distribution system interface, rather than sending the geolocation signals to the communication unit.

24. The repeater base station apparatus as claimed in claim 22, wherein the repeater base station apparatus is fixed in space and the processor is further for sending a programmed location of the repeater base station apparatus to the communication unit via the infrastructure distribution system interface.

25. A communication unit for use within an obstructed area where geolocation signals from at least one navigation satellite are attenuated due to obstructions between the communication unit and the at least one navigation satellite, the communication unit comprising:

an antenna for receiving the geolocation signals from an infrastructure redistribution means which is dispersed throughout the obstructed area when the communication unit does not receive the geolocation signals directly from the at least one navigation satellite, wherein the infrastructure redistribution means retransmitted the geolocation signals after receiving them from a device located outside of the obstructed area after the device received the signal from the at least one navigation satellite; and a processor, coupled to the antenna, for processing the geolocation signals.

26. The communication unit as claimed in claim 25, wherein the processor is further for calculating a location of the communication unit based on the geolocation signals.

* * * * *